Jan. 17, 1956   G. E. FLURSCHUTZ   2,731,243
MOUNTING OF SINUOUS FIN ELEMENTS
Filed April 5, 1954   2 Sheets-Sheet 1
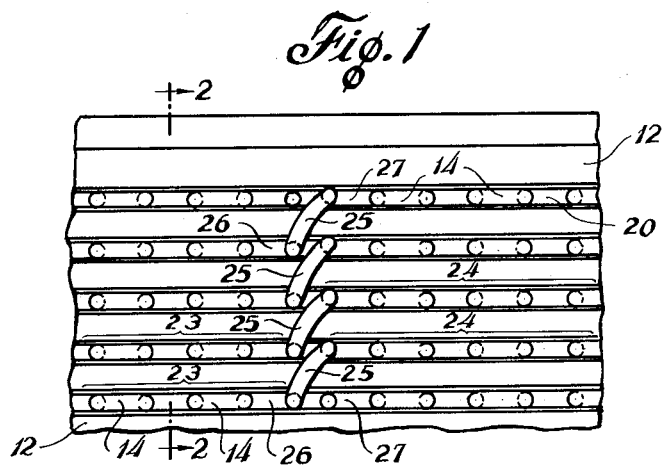
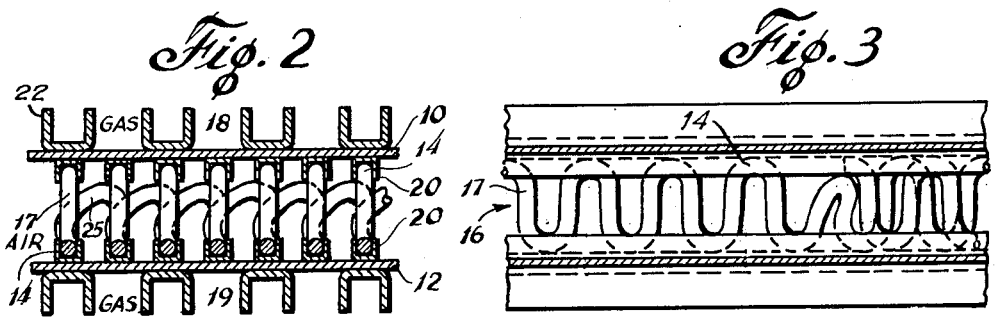
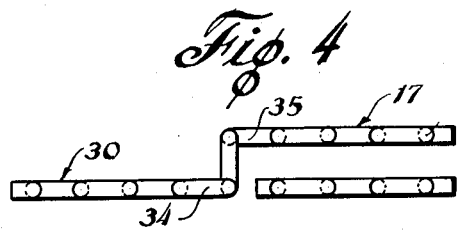
INVENTOR.
Glenn E. Flurschutz
BY James J. Whalen
ATTORNEY Jan. 17, 1956  G. E. FLURSCHUTZ  2,731,243
MOUNTING OF SINUOUS FIN ELEMENTS
Filed April 5, 1954  2 Sheets—Sheet 2
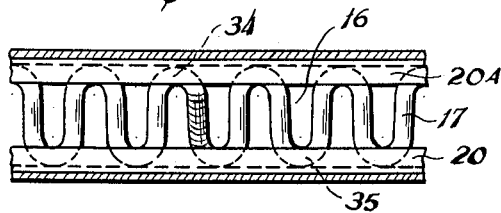
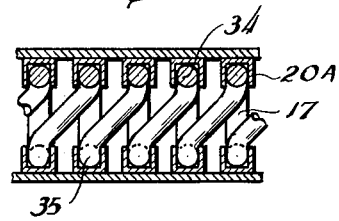
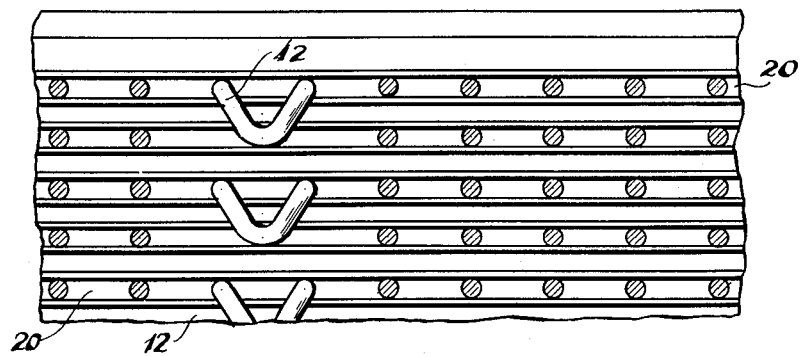
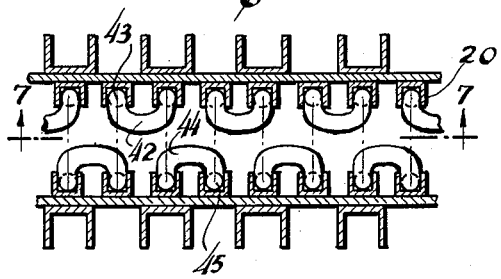
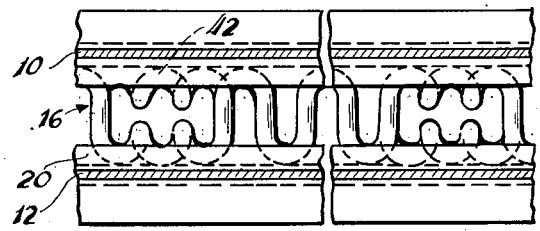
INVENTOR.
Glenn E. Flurschutz
BY
ATTORNEY

United States Patent Office 2,731,243
Patented Jan. 17, 1956

2,731,243
MOUNTING OF SINUOUS FIN ELEMENTS

Glenn E. Flurschutz, Wellsville, N. Y., assignor to The Air Preheater Corporation, New York, N. Y., a corporation of New York Application April 5, 1954, Serial No. 420,795

9 Claims. (Cl. 257—245)

The present invention relates to apparatus for the exchange of heat between two confined fluids and in particular it relates to improvements in extended surface for the walls of a heat exchanger passage including a series of sinuous wires which are interlocked so as to greatly facilitate handling during the preliminary assembly thereof.

One type of heat exchanger for transferring heat between two confined fluids comprises metallic plates spaced apart to form fluid pasages through which one fluid is circulated for transferring heat through a passage wall formed by a metallic plate to another fluid in an adjacent passage, the passages for the heating fluid and fluid to be heated being arranged in alternation. The spaces between the adjacent plates are closed along one pair of opposite edges to close the sides of the fluid passages.

To increase the efficiency of heat transfer between the two fluids through the passage walls, the latter may be provided with extended surface in the form of pin like fins that project into the fluid stream as disclosed in Holm, Patent 2,595,457. To facilitate manufacturing and assembly the pins usually comprise the straight portion of a series of sinuously formed wires which are then placed between the wall forming plates parallel to the direction of fluid flow. With the use of such sinuously formed wires there still exists the problem of holding these formed wires in an upright position between the plates during the assembly and brazing operations. Therefore, the present invention contemplates an improved pin arrangement which makes it possible to rapidly assemble a plurality of sinuously formed wire strips into an integral matrix of sinuous wires firmly held in an upright position and in a definite spaced relationship. The invention will best be understood upon consideration of the following detailed description of illustrative embodiments thereof when read in conjunction with the accompanying drawings in which:

Figure 1 is a plan view of a heat exchange passage as seen with its top plate or wall removed.

Figure 2 is a transverse sectional view of the heat exchanger envelope showing the interconnecting wire loops as seen from 2—2 of Figure 1.

Figure 3 is a side elevation, partly in section, of the heat exchanger of Figure 1.

Figure 4 is a top plan view of modified form of the invention.

Figure 5 is a side elevation showing an offset undulated wire between fluid confining plates.

Figure 6 is a transverse sectional view of a heat exchange envelope having offset undulated wires of the type illustrated in Figure 5.

Figure 7 is a plan view of a heat exchanger envelope as seen from section 7—7 of Figure 8.

Figure 8 is a transverse sectional view of the heat exchanger envelope showing the interlocking loops and channels adjoining each wall.

Figure 9 is a longitudinal sectional view of the modification shown in Figure 8.

In the drawing the numerals 10 and 12 designate a pair of metallic plates spaced apart to form a passageway 16 through which air or other fluid to be heated is circulated in heat transfer relation with another fluid such as hot gas flowing through passageways 18 and 19 located between plates 10 and 12 and the walls of adjacent air passages which combine to form a completed heat exchanger. To provide extended surface in the gas passageway 16 a plurality of fins 17 are mounted between the surfaces of walls 10 and 12. These fins comprise rows of sinuously bent wires forming U-shaped loops extending back and forth between passage walls so that the upright portions of each loop provide pin-like fins 17 extending between passage walls. To facilitate bonding these sinuous elements to the passage walls 10 and 12, adjacent bight or yoke portions 14 of each element are impressed into a pair of parallel channel members 20 so that channel members extend along opposite edges of the sinuously bent wire element. The undulated wires and their associated channel members 20 are then positioned between the plates 10 and 12. Channel members 22 may also be mounted longitudinally on the outer surface of walls 10 and 12 to constitute extended surface members projecting into the gas passageways formed between several adjacent "envelope" components consisting of a pair of plates with attached fin elements 17 and 22.

In assembling the aforementioned elements into a component as illustrated in Figure 2, a selected number of channels 20 having inserts of copper or other brazing material are first placed open side up in a special jig having parallel slots corresponding to the desired spacing of the undulated wire strips on the passage walls. Sections of the sinuously undulated wire are then passed through a special forming or bending die which at certain predetermined intervals laterally displaces part of the undulated wire so contiguous portions 23 and 24 of the wire are laterally displaced a distance equal to the space between adjacent sinuous wire strips. The yoke or bight portion 25 that interconnects adjacent U-shaped loops 26 and 27 and now extending between adjacent channel members 20 is laterally bent slightly to avoid interference with either adjacent channel member. A series of wires so formed are assembled in the adjacent parallel channels 20 so a line joining offset loops 25 of adjacent wire strips lies substantially normal to the parallel channels 20 as shown in Figure 1. After all (lower) channels 20 in the jig have been supplied with undulated wire strips in the manner disclosed, other channels are placed on the upper yokes and rolled into place making the entire body of wires into a composite matrix of extended surface pins 17 linked together at predetermined intervals by lateral loops 25. The matrix of undulated wires is then placed between two plate walls 10 and 12 and channels 22 are laid longitudinally along the outer surfaces thereof to provide further extended surface in the passageway between envelopes.

Figures 4, 5 and 6 illustrate a modification of the invention varying only in the specific offset given the cross loops of the undulated wire strips. In this form each of the undulated wire strips 30 is given a sharp offset at predetermined intervals so a pair of oppositely disposed yoke portions 34 and 35 may be inserted into two adjacent channels 20 thereby leaving no intermediate loop lying in the area between channels 22 as does the loop 28 of the previously disclosed form.

In passing through the wire forming die, each leg which forms the lateral extension of the undulated wire strip is slightly stretched to enable the laterally displaced yoke portions to be firmly seated in their respective channels 20 and thereby afford a good brazing contact.

The wire strips are assembled together with upper and lower channels 20 in the same manner as outlined for the preceding modification.

Figures 7, 8 and 9 disclose still another arrangement for combining a plurality of sinuously undulated wire strips into an integral self supporting matrix. Instead of offsetting a plurality of spaced loops until they coincide with immediately adjacent channels 20, loops 42 at predetermined intervals are bent around 180 degrees so the yoke portion 43 thereof is displaced laterally into an adjacent channel 20 whereby it lies in the same plane as the yoke portions of loops in an adjacent wire strip. Furthermore, alternate loops 44 may be bent to opposite sides of the parent strip to align themselves by engagement of yokes 43 and 44 with channels 20 on both sides of the undulated strip.

What is claimed is:

1. A heat exchanger envelope having a pair of metallic plates spaced apart to form walls for a fluid passageway therebetween; a plurality of parallel channel members mounted in opposing pairs on said passage walls; a fin element made up of a metallic wire sinuously bent to form leg portions thereof extending in an upright relation between channel members and the intervening yoke portions disposed in alignment and fitted into one of a pair of opposed channels; and another similarly formed sinuous fin element having a majority of loops thereof fitted into a contiguous pair of opposed channel members and other loops offset into the plane of and aligned with the loops of said first element and fitted into related channels to tie said elements together.

2. In a heat exchanger having a pair of metallic plates spaced apart as walls of a fluid passage; a plurality of parallel channel members mounted in said passage in pairs whose constituent channels face each other with their bases bonded to one of the confronting wall surfaces of said passage; a first fin element comprising a metallic wire sinuously bent to provide generally U-shaped loops therein with the leg portions thereof forming pin fins for said walls and the intervening yoke portions fitted into opposed channels to connect contiguous fins; and another similar sinuously formed fin element with some loops thereof fitted into a contiguous pair of opposed channels and other loops offset with the plane of and aligned with the loops of said first element and fitted into the related channels to tie said elements together.

3. A finned component for application to a wall of a heat exchanger passage comprising a plurality of parallel finned elements each made up from a metallic wire sinuously bent to provide generally U-shaped loops with the leg parts thereof that form pin fins for said wall interconnected by the yoke or stretcher portions of said loops, spaced looped elements being offset laterally into alignment with adjacent looped elements and constituting in effect a continuation thereof; oppositely positioned metallic channel members extending longitudinally of each element fitted over and engaging the yoke parts of the U-shaped loops of each element and also the corresponding yoke parts of offset loops of the laterally adjacent elements.

4. A matrix for bonding to a wall of a heat exchanger passage to provide extended surface therefor comprising; a plurality of parallel fin elements each made up of a metallic wire sinuously bent to form alternately upright and inverted loops of approximate U-shape having yoke portions that join leg portions of loops contiguous along said element aligned along the longitudinal axis of said wire element, and predetermined loops of each fin element being offset laterally into the plane of an element immediately adjacent thereto and aligning with the loops thereof; and a pair of channel elements fitted over and engaged with the aligned yoke portions and also with similar yoke portions of the offset loops of said adjacent element for tying all wire elements together in an upright and parallel relationship.

5. A heat exchanger envelope having a pair of metallic plates spaced apart to form parallel walls for a fluid passageway therebetween; rows of channel members spaced apart in a parallel relationship engaging each passage wall; a plurality of wires bent to substantially sinusoidal form to provide a series of oppositely extending U-shaped loops having leg portions extending in an upright relation between opposing channel members and the intervening yoke portions lying within the parallel channel members; and adjoining sections of each sinusoidal wire offset to lie between adjacent pairs of opposing channel members.

6. In a heat exchanger having spaced metallic walls defining a passageway for the flow of fluid therebetween; a plurality of parallel channel members mounted in opposing pairs on the walls of said passageway; a plurality of heat transfer elements in said passageway each comprising a continuous wire strip undulated to provide a series of oppositely extending leg parts lying between opposing channel members with intervening yoke portions that join the leg parts disposed in contacting relation with one of the parallel channel members; and consecutive segments of said wire strip offset to lie between adjacent pairs of opposing channel members with a single interconnecting leg diagonally disposed in the passageway between adjacent pairs of opposing channel members.

7. In a plate type heat exchanger having spaced metallic walls defining a passageway for the flow of fluid therebetween; rows of parallel channel members bonded to each passage wall in opposing pairs; a plurality of heat transfer elements in said passageway each comprising a continuous wire strip undulated to provide a series of U-shaped loops including leg parts extending between opposing pairs of channel members and intervening yoke portions that join the leg parts disposed in alignment and fitted into one of a pair of opposed channel members; and interconnected segments of said undulated wire strip offset to lie between adjacent pairs of opposing channel members with an entire U-shaped loop comprising the interconnecting link between wire segments.

8. A plate type heat exchanger as defined in claim 6 wherein each interconnecting U-shaped loop is laterally bent to avoid interference with adjacent channel members.

9. In a heat exchanger having spaced metallic walls defining a passageway for the flow of a fluid therethrough, a plurality of parallel channel members mounted on said passage walls in opposing pairs whose constituent channels face each other with their bases bonded to one of the passage walls; rows of parallel fin elements in said passageway each comprising a continuous wire sinuously formed to provide a series of oppositely extending U-shaped loops having leg portions extending in an upright relation between opposing channel members and intervening yoke portions fitted into opposed channels that connect contiguous legs, and spaced loops at predetermined intervals bent 180 degrees to firmly engage an adjacent channel member to thereby tie adjacent rows of fin elements together in parallel relationship.

References Cited in the file of this patent

UNITED STATES PATENTS 2,645,462    Holm _____ July 14, 1953

FOREIGN PATENTS 1,032,901    France _____ Apr. 1, 1953